United States Patent [19]

Keuchel

[11] 4,451,420

[45] May 29, 1984

[54] SYNTACTIC PHASE EXTRUSION

[76] Inventor: Herbert W. Keuchel, 765 Forestview Dr., Tallmage, Ohio 44278

[21] Appl. No.: 238,269

[22] Filed: Feb. 25, 1981

[51] Int. Cl.³ .............................................. D01D 5/20
[52] U.S. Cl. ..................................... 264/167; 264/74; 264/171; 425/132
[58] Field of Search .................. 264/73, 75, 167, 171; 425/132

[56] References Cited

U.S. PATENT DOCUMENTS

| | | | |
|---|---|---|---|
| 2,460,605 | 2/1949 | Soissa | 264/73 |
| 3,180,912 | 4/1965 | Rowe, Jr. | 264/75 |
| 3,453,688 | 7/1969 | Otstot et al. | 264/167 |
| 3,792,945 | 2/1974 | Randall | 425/132 |
| 4,011,292 | 3/1977 | Randall | 264/75 |
| 4,126,724 | 11/1978 | Randall | 264/73 |

FOREIGN PATENT DOCUMENTS 2823638 12/1978 Fed. Rep. of Germany .
49-8765 4/1974 Japan .

Primary Examiner—Donald E. Czaja
Assistant Examiner—W. Thompson
Attorney, Agent, or Firm—John E. Benoit

[57] ABSTRACT

A process and apparatus for producing a mixture of polymeric phases wherein a plurality of fluid material having different phases are fed into a phase programmer, and said phase programmer separately and sequentially injects pulses of said polymeric materials into a reservoir. The material may be passed through an extrudate shaping device so as to provide a moasic structure comprising an agglomeration of a plurality of said polymeric phases, each of which phases are substantially non-continuous in any dimension and which are interrupted with substantially no intermixing between phases.

6 Claims, 9 Drawing Figures

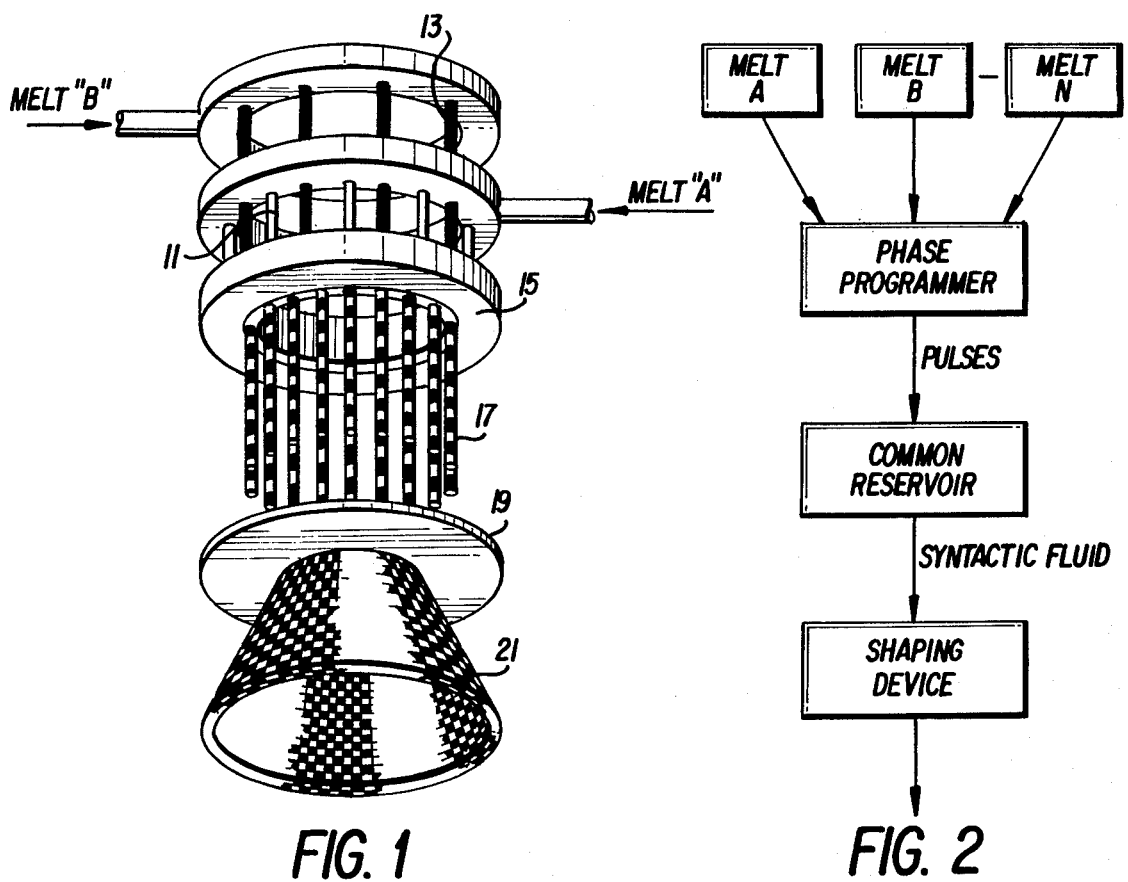
FIG. 1
FIG. 2
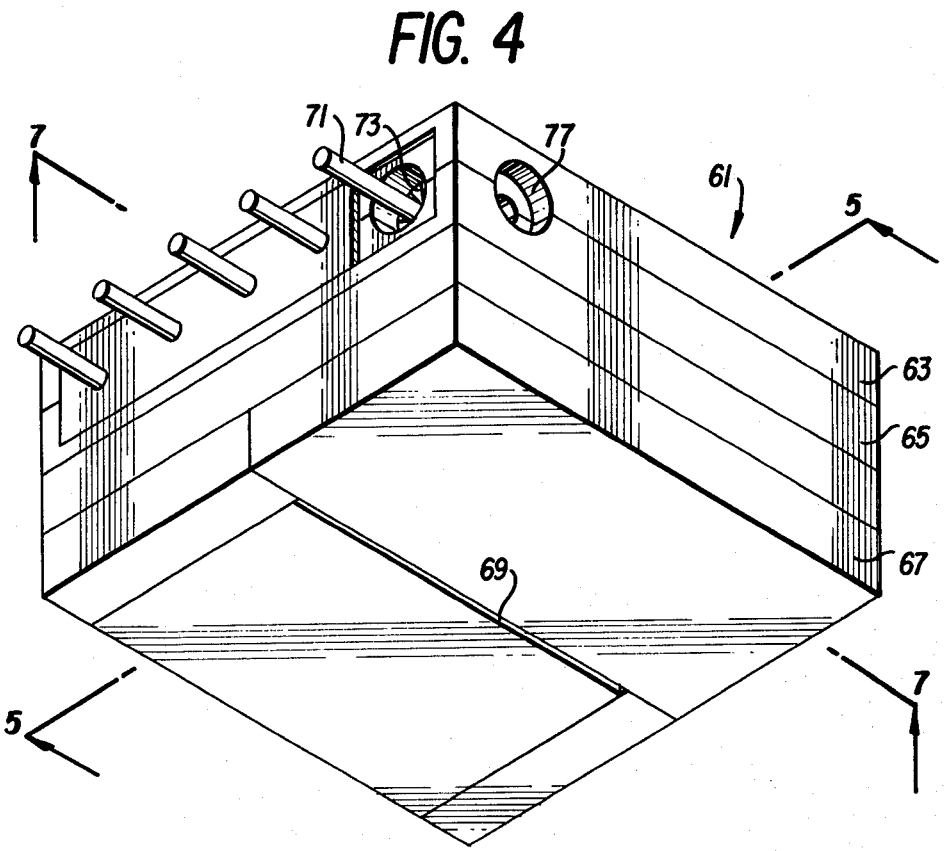
FIG. 4

SYNTACTIC PHASE EXTRUSION

This invention relates generallty to the production of an agglomeration of a plurality of polymeric phases which are non-continuous in any dimension and which are interrupted with substantially no intermixing of the respective melt or fluid streams, thus producing a three-dimensional mosaic structure.

Conventional non-woven processes, such as spun-bonding, avoid the constraints of the loom but require fiber spinning. Tape weaving is produced from film derived tapes, but it requires a slow weaving process.

Processes avoiding the constraints of both the spinnerette and loom are presently under development. Most of these processes are based on plastics extrusion technology using one extruder for each web-forming station with relatively low labor and capital requirements.

Foam attenuated products are reticulated, fibrous webs derived directly by extrusion of a molten foam via drawdown and stretch.

Web and scrim extrusion are relatively slow processes, resulting in two dimensional products with only one filament of thickness. This technology is based on multi-filament extrusion and filament cross-over welding, or sheet extrusions embossing and biaxial stretching.

Mechanical fibrillation uses the scoring action of a tool against the surface of a highly oriented film. The process does not work with most fiber forming polymers, and it does not produce fine enough fibers for most textile applications.

At the present time, direct fabric extrusion processes are very specific in their ability to produce textile fabrics. The best products are derived from the most expensive processes and the cheapest products have very limited application potential.

Accordingly, converting a molten polymer continuously into the fibrous web is most desirable. Methods which have been most seriously considered involve fibrillation of one kind or another and fiber spraying.

One method tried repeatedly, but without success to my knowledge, is based on mechanically separating into fibers phases of multi-phase systems. Failure to separate phases into filaments is normally due to the complex structure produced by the phase mixing method employed. The ability to combine phases with limited interface adhesion and to bulk-mix these phases into very small sizes has been the most attractive feature for choosing this approach. Unfortunately, this aspect also has been the cause of serious process problems. One problem is that bulk phase mixing produces stearically enmeshed phase mixtures which do not separate into "clean" fibers. Another problem is that the degree of mixing and, therefore, the size of the phase substrate produced is not sufficiently controllable. In most cases experienced, these phases are very small, producing filament structures with high surface to volume ratios which would require excessively high levels of mechanical energy for phase separation.

Accordingly, it is an object of this invention to provide a syntactic phase mixture which avoids the problems which are identifiable with the previously known processes as described above.

This and other objects of the invention will become apparent from the following description taken in conjunction with the drawings.

BRIEF DESCRIPTION OF THE DRAWINGS

FIG. 1 is a schematic representation showing the basic concept of the present invention;

FIG. 2 is a schematic box diagram illustrating the process of the present invention;

FIG. 4 discloses an alternate embodiment showing a programmer assembly for performing the present invention;

BRIEF DESCRIPTION OF THE INVENTION

Figure 3:
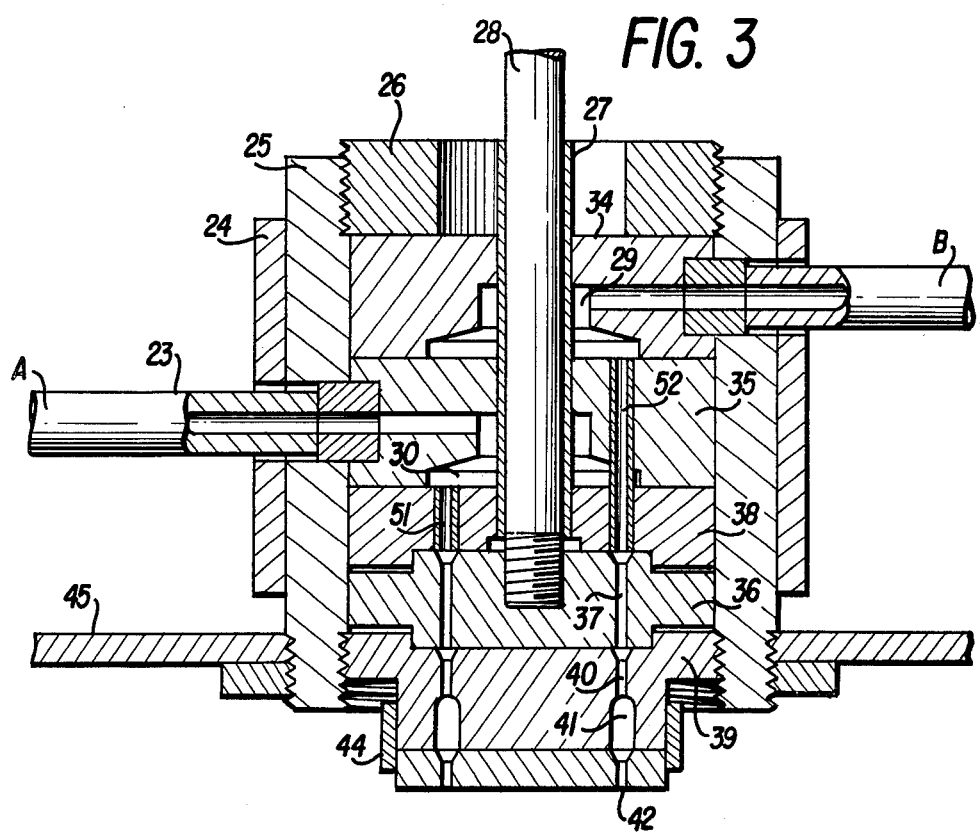
FIG. 3 is a cross-sectional view of one basic phase programmer and die for providing the functional results of FIG. 1.

The word syntactic phase mixing is used in the present context with the term "syntactic" generally defined in the dictionary as "arranging in an order that which is being referred to". Since the various phases are programmed so as to be in order, such a final result is herein defined as a syntactic phase mixture. As will be obvious, syntactic phase mixing uses different phases which may either be different polymers or similar polymers and which may be modified for specific purposes such as differing colors, differing viscosities, differing chemical characteristics and/or differing physical characteristics.

The present invention is based upon the development of such syntactic phase mixtures. Different phases are individually "packaged" into a mosaic structure wherein any cross-section of such a structure will resemble a mosaic. This syntactic phase mixture may then be distorted and shaped during extrusion and drawn down into the final desired form such as fibers, tapes, sheets, shaped articles, pipes, tubes, etc.

The invention provides a multiphase syntactic substrate and the process and apparatus for making same which consists of the steps of separately and sequentially injecting pulses of a plurality of fluid polymeric materials into a reservoir to form a mosaic like dispersion, and flowing said dispersion from said reservoir through a shaping device.

DETAILED DESCRIPTION OF A PREFERRED EMBODIMENT OF THE INVENTION

Referring now to FIG. 1, several fluid streams are separately and sequentially injected into a common stream to form a mosaic like dispersion. Once formed, the unique dispersion may be further treated to deform and/or attenuate the aggregates of the dispersion. The stream may then be shaped into desired extrudate as discussed above. Melt A and melt B are inputs of two different fluids being placed into their respective manifolds.

Each manifold has a plurality of melt flow channels 11 and 13 extending downwardly for directing the flow of the respective melts.

A rotor pulse generator 15 also has a series of channels (not shown) which are continually rotated past and intermittently mate with the channels 11 and 13 in alternate fashion. This provides a series of pulses in each of the channels (not shown) having alternate phases.

When the outputs 17 of the channels are passed to collector 19, they may be formed into a syntactic melt which includes phases which are so placed that phases of one type are placed next to the phases of another type so as to minimize like-phase contact.

FIG. 2 is a diagrammatic illustration of the process which is shown schematically in FIG. 1. In order to emphasize that more than two phases may be used, there are shown a plurality of melts, A, B through N which are placed into a phase programmer which, in the illustration of FIG. 1, is shown as the pulse generator 15. The output of the phase programmer is collected in a reservoir with the resultant syntactic mixture from the common reservoir being flowed through a shaping device. This process may be accomplished in a number of ways, several of which will be described herein.

Figure 9:
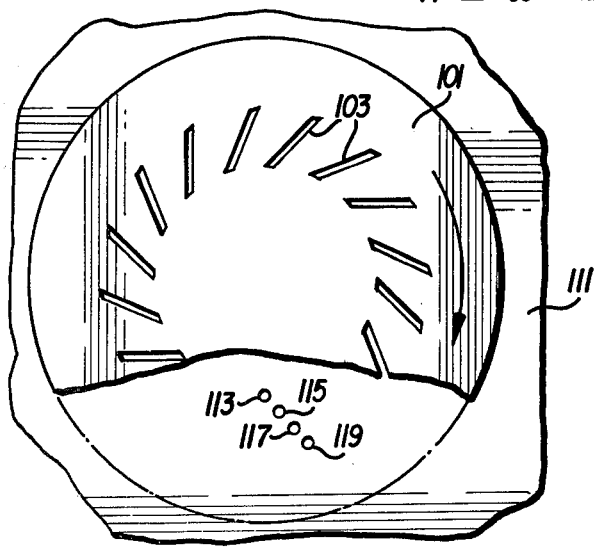
FIG. 9 is a schematic illustration of a phase programmer having rows of channels.

Turning now to FIG. 3, there is shown a cross-sectional view of one type of syntactic phase programmer and die which may be used in the present invention. It should be clearly noted that, for simplicity sake, the phase programmer is shown as having only two phases and one thickness dimension involved. However, it will be obvious that multiple phase inputs could be used. The isolation of like phases from other phases in a syntactic mixture increases as the number of different phases introduced into the process is increased. FIG. 9 illustrates a multi-thickness phase programmer for obtaining a syntactic structure having the same multiple phases in the same relationship as schematically illustrated in FIG. 1.

The programmer includes melt input A and melt input B. These inputs are provided to the programmer by adapters 23 which are interconnected with the extruder (not shown). A heater 24 surrounds the programmer so as to maintain the phases in a fluid stated.

The basic programmer is shown as maintained in a cylindrical housing 25 and secured thereto by means of pressure nuts 26. A drive shaft 28 is maintained within a sleeve bushing 27 and is rotatable within the manifold blocks 34 and 35 and block 38. A rotor 36 is secured to the inner end of drive shaft 28 and is rotatable therewith. A plurality of channels 37 are located within this rotor. Breaker plate 38 includes melt flow channels 51 and 52 for interfacing melts A and B with rotor 36.

A die 39 is secured to the lower end of cylindrical housing 25 and includes therein a plurality of flow channels 40 which are interconnected with circular die slot 42 via reservoir 41. The number and location of die flow channels may be varied in accordance with specific requirement. The cross-sectional view shows two such flow channels. A heater 44 may be provided to surround the lower part of die 39. A support plate 45 is provided so as to maintain the programmer in position, counteracting the torque-forces generated while driving the rotator. Heaters 24 and 44 may be connected to automatic temperature controls (not shown) so as to maintain and control the temperature of the material while passing through the programmer and die.

The operation of the programmer is as follows. Melts A and B are under pressure and are supplied through the melt inlets from respective extruders (not shown). In the example shown, all of the parts are stationary with the exception of the drive shaft 28 and the rotor 36. Accordingly, melt B enters the melt manifold 29 and melt A enters the melt manifold 30. Melt A is forced under pressure through flow channel 51 and melt B is forced under pressure through flow channel 52.

It is to be understood that there may be a plurality of such channels arranged on several concentric circles in the manifold block, breaker plate and die. Such an arrangement is illustrated schematically in FIG. 9 with rotor 101 having a plurality of slots 103 which are located about a predetermined radius and extend through rotor 101 so as to accept the output of various concentrically located channels in the breaker plate (not shown) and to feed several concentrically located channels 113, 115, 117 and 119 in die 111. These channels mate with slots 103 of rotor 101 as it rotates. Each has a corresponding position within block 35 and plate 38 so that they appear alternately to the rotor. The resulting mosaic is shown schematically in FIG. 1.

Referring to FIG. 3, as rotor 36 is rotated, a fluid section is injected into rotor flow channel 37. Therefore, as rotor 36 rotates, alternate phases will be injected into flow channel 37 so that the output thereof into flow channel 40 will exhibit the alternate phase characteristic as indicated in FIG. 1.

Turning now to FIGS. 4, 5, 6 and 7, there is illustrated an alternate embodiment of the basic invention as described above which is capable of producing syntactic, multi-phase plugs, sheets, films, tapes, shaped articles, pipes, etc. as is the previously described apparatus.

FIG. 4 illustrates a manifold 61 which is comprised of mating sections 63 and 65. The die 67 has adjustable lips for forming the extrusions slot 69. Pulse generators 73 are secured so as to rotate within manifold 61 and have operating shafts 71 extending outwardly therefrom.

Figure 5:
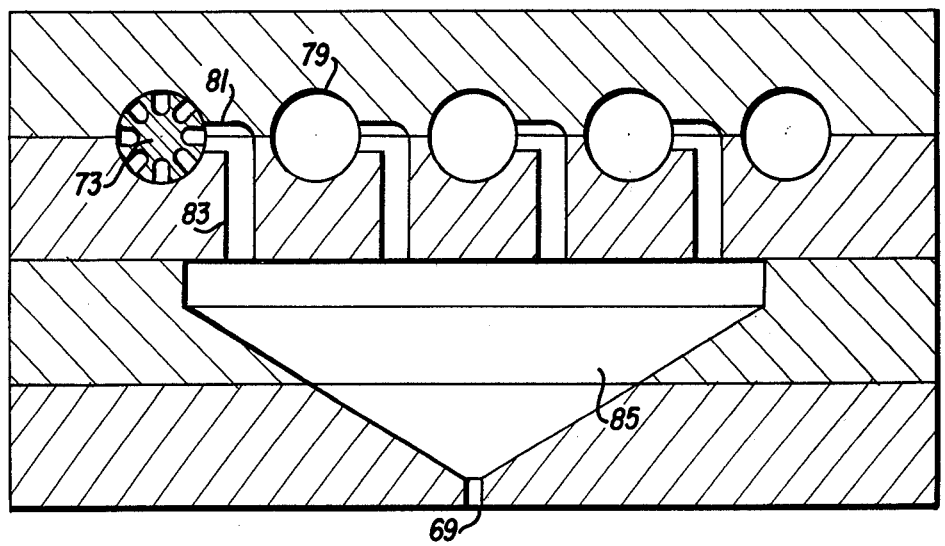
FIG. 5 is a cross-sectional view taken along the lines 5—5 of FIG. 4.

FIG. 5 shows a cross-sectional view of the die of FIG. 4 with one of the pulse generators 73 shown in place in one of the cylindrical housings 79 which are designed so as to accept the pulse generator while providing sufficient clearance for rotation of the generator. Feed ports 81 extend outwardly from the generator and are interconnected with injection ports 83 which supply the extrudate to hold-up reservoir 85 from whence it is forced through the extrusion slot 69.

Figure 6:
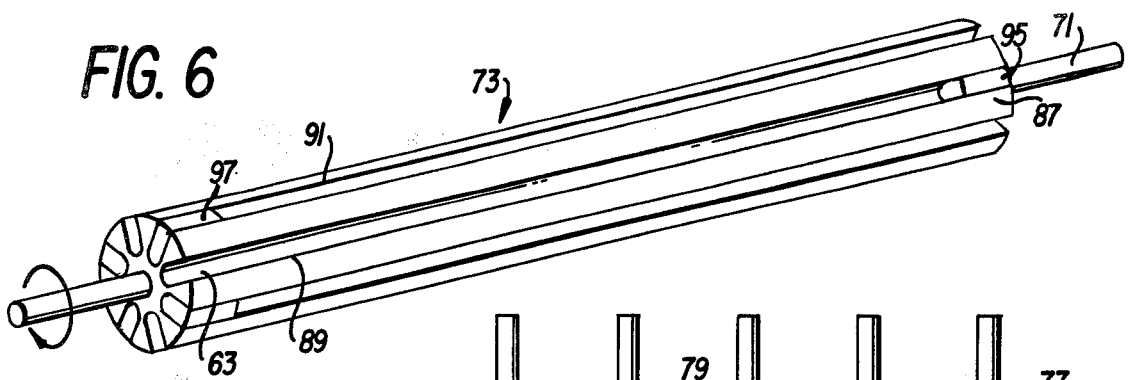
FIG. 6 is a perspective view of one of the pulse generators as shown in FIG. 4.

FIG. 6 is a perspective showing of one of the pulse generators 73 which is used in the basic apparatus. This is a fluted generator which includes the end shaft 71 for providing the rotational drive connection together with longitudinal flights 87 and a plurality of melt flow channels such as 89 and 91 with end plugs 95 and 97 being inserted in alternate flow channels at opposite ends of the generator.

Figure 7:
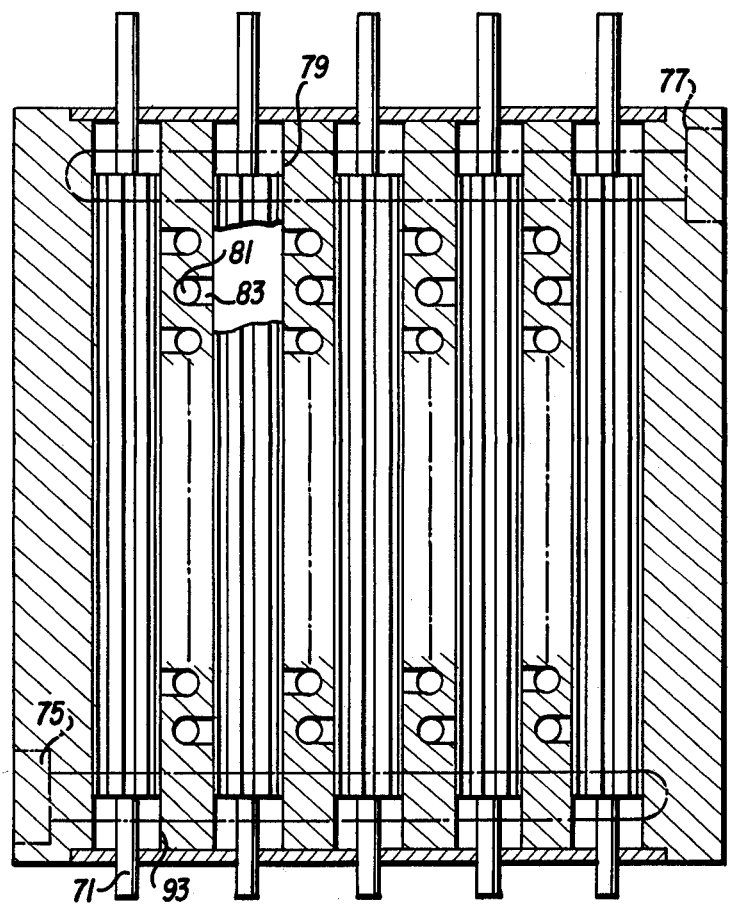
FIG. 7 is a sectional view taken along the lines 7—7 of FIG. 4.

FIG. 7 is a sectional view taken along the lines 7—7 of FIG. 4 and illustrates the main fluid manifold input channels 75 and 77 together with cylindrical housings 79 for the pulse generators 73. There is further indicated bushings 93 for accomodating the end shaft 71. Also shown are the feed ports 81 and the injection ports 83.

When the apparatus described above is operational, different fluids such as A and B, under pressure, enter the main manifold channels 75 and 77 respectively. The fluids flow into their respective flow channels 89 and 91 of the generator 73 while the generator element rotates about its axis. Whenever a fluid channel 91 or 89 faces a row of feed ports 81, fluid penetrates these flow passages so as to enter injection ports 83 and pass to the holdup reservoir 85, and is subsequently extruded out of the extrusion slots 69 as a mosaic aggregate as described in connection with the apparatus of FIG. 3.

The ends of the pulse generator 73 extend partly into the main flow channels 75 and 77. Plugs 95 and 97, each prevent one of the fluids of A and B from entering these channels. With such an arrangement, fluid channels are filled alternately with fluids A and B.

Access channels, i.e. feed ports 81, are joined to the cylindrical housing 79 also in an alternate fashion. Rotation of the pulse generators is designed so as to fill these passages in alternate periods with A and B fluids in rows and columns over the entire matrix of feed ports.

Depending upon the extrusion slot dimension, the extrudate produced therethrough may be a rectangular plug, a shaped article, a sheet, film, etc. produced from the mosaic aggregate.

In the particular example shown in FIGS. 4 through 7, there exists a phase programmer comprised of five pulse generators having 8 flow channels feeding four rows of ten holes. At 100 rpm revolution of the generator, each hole will receive $100 \times 8 = 800$ pulses per minute. The entire $5\frac{1}{2}''$ extrusion slot will receive $800 \times 40 = 32,000$ pulses per minute or 1,920,000 pulses per hour. At an extrusion rate of 10 pounds per inch of slot length, or 55 pounds per hour for the particular die shown, the pulse weight amounts to 0.013 grams.

Figure 8:
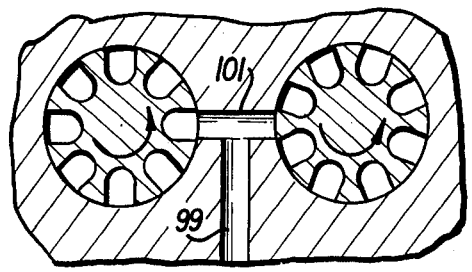
FIG. 8 is a schematic partial view of a modification of the embodiment of FIG. 4.

Variations are available relative to this type of generator, one such variation being illustrated schematically in FIG. 8 wherein the pulse generation may be doubled by feeding an injection port 99 alternately to a common feed port section 101 which interconnects the two flow generators with the output going to the channel 99.

Thus, in any of the above disclosed embodiments, several fluid streams are separately and sequentially injected into a common stream to form a syntactic mixture. Once formed, this unique mixture may be further treated to deform and/or attenuate the aggregates of the mixture. As stated, the mixture may then be shaped into the desired extrudate. Some extrudates, such as fibers, tapes, sheets and webs, may be further stretched after discharge from the die.

It should be understood that the shape of the pulses exiting from the phase programmer may be other than the cylinders schematically depicted. Factors such as friction may cause the ends of each pulse to be concave/convex. Additionally, the cross-section of the channels may be altered so as to produce variation in pulse shape.

The above description and drawings are illustrative only. As will be evident, equivalent structure and components could be substituted without departing from the invention which is to be limited only by the scope of the following claims.

I claim:

1. A process for providing a mixture of polymeric phases which consist of
    separately providing a plurality of fluid polymeric materials having different phases;
    separately and sequentially injecting pulses of said plurality of fluid polymeric materials into a plurality of flow channels so as to provide polymeric components having alternate phase characteristics;
    discharging said fluid components from said flow channels;
    combining said fluid components in a common reservoir so as to form a mosaic-like dispersion; and
    flowing said mosaic-like dispersion from said reservoir through a shaping device so as to provide a mosaic structure.

2. The process of claim 1 further consisting of maintaining said polymeric material within a predetermined temperature range throughout the steps of said process.

3. Apparatus for providing a mixture of polymeric phases comprising
    means for separately providing a plurality of fluid polymeric materials having different phases;
    a plurality of flow channels;
    means for separately and sequentially injecting pulses of said plurality of fluid polymeric materials into said flow channels so as to provide polymeric components having alternate phase characteristics;
    means for discharging said fluid components from said flow channels;
    means for combining said fluid components in a common reservoir so as to form a mosaic-like dispersion; and
    means for flowing said mosaic-like dispersion from said reservoir through a shaping device so as to provide a mosaic structure.

4. The apparatus of claim 3 wherein said means for separately and sequentially injecting said pulses into said reservoir comprises
    a manifold having a plurality of melt flow channels therein;
    at least one rotor pulse generator adjacent to the output of said melt flow channel and between said flow channel and said reservoir;
    a plurality of channels in said generator; and
    a drive shaft connected to said generator for rotating said plurality of channels in said generator so that they intermittently mate with said melt flow channels.

5. The apparatus of claim 3 wherein said shaping means is an extrusion die.

6. The apparatus of claim 3 further comprising means for maintaining said polymeric material within a predetermined temperature range.

* * * * *